United States Patent

[11] 3,623,642

| [72] | Inventor | James Stephen, Royal Oak, Mich. |
|---|---|---|
| [21] | Appl. No. | 820,527 |
| [22] | Filed | Apr. 30, 1969 |
| [45] | Patented | Nov. 30, 1971 |
| [73] | Assignees | James Stephen<br>Royal Oak, Mich.;<br>Helm Design & Manufacturing, Inc.<br>Detroit, Mich. |

[54] MODULAR LUGGAGE RACK
24 Claims, 23 Drawing Figs.

[52] U.S. Cl. .................................................. 224/42.1 E
[51] Int. Cl. ..................................................... B60r 9/04
[50] Field of Search........................................... 224/29,
42.1 A, 42.1 B, 42.1 D, 42.1 E, 42.1 F, 42.1 G;
280/179; 296/39, 40

[56] References Cited
UNITED STATES PATENTS

| 2,001,935 | 5/1935 | Otis | 280/179 X |
| 2,914,231 | 11/1959 | Hornke | 224/42.1 E |
| 3,253,755 | 5/1966 | Bott | 224/42.1 E |

FOREIGN PATENTS

| 570,305 | 12/1957 | Italy | 224/42.1 E |
| 907,235 | 10/1962 | Great Britain | 224/42.1 E |

*Primary Examiner*—Gerald M. Forlenza
*Assistant Examiner*—Frank E. Werner
*Attorney*—Barnes, Kisselle, Raisch & Choate ABSTRACT: A modular luggage rack comprising a bed having a plurality of spaced longitudinally extending strips fixed to the car top and side rails fixed to the car top. Each of the side rails has longitudinally spaced elongated openings. Stanchions can be provided at the ends of the side rails and in turn support upper side rails and crossrails. Alternatively end plugs can be provided on the ends of the side rails. Ski racks can be mounted in the openings of the side rails. A luggage bag can also be attached to the rack through the openings in the side rails.

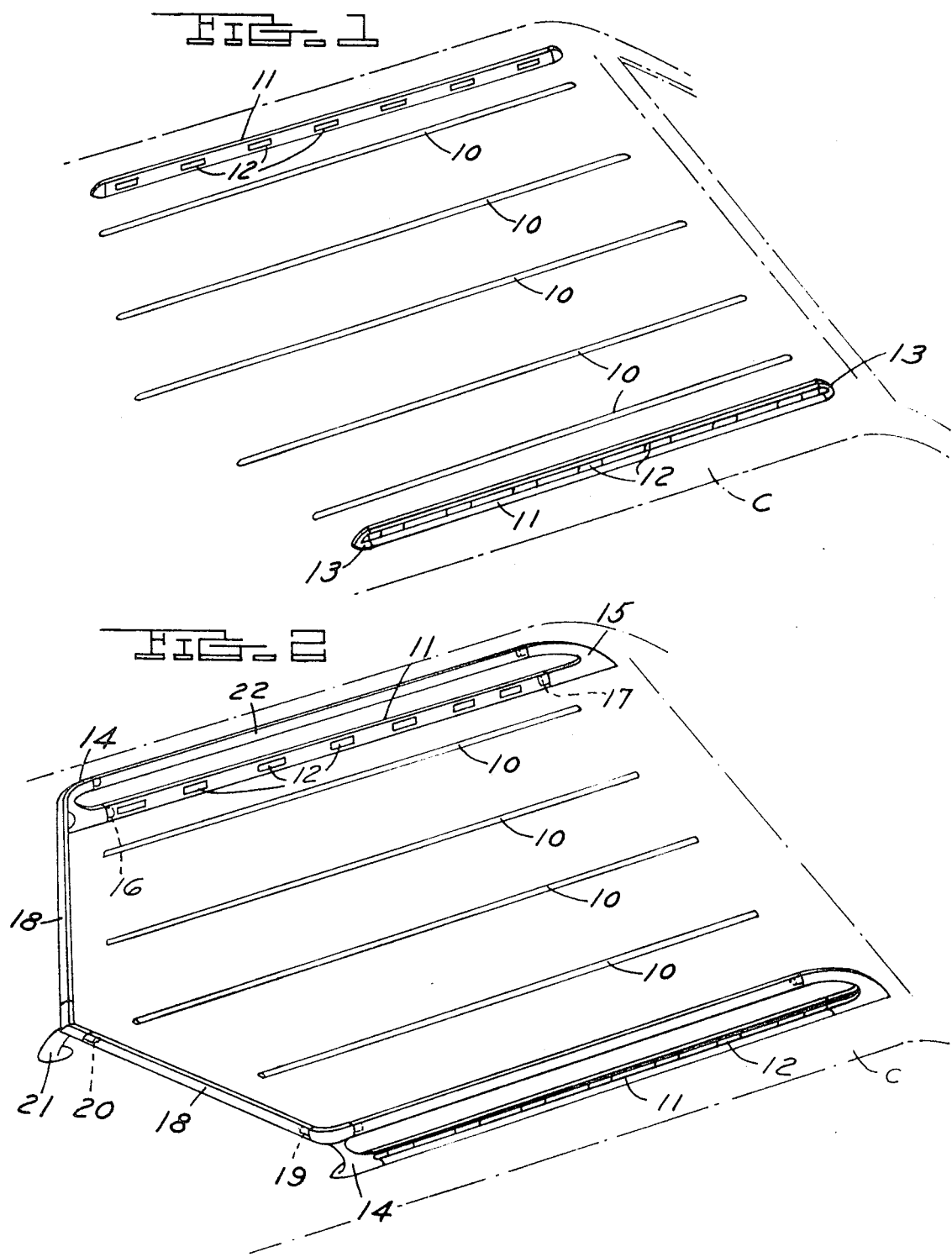

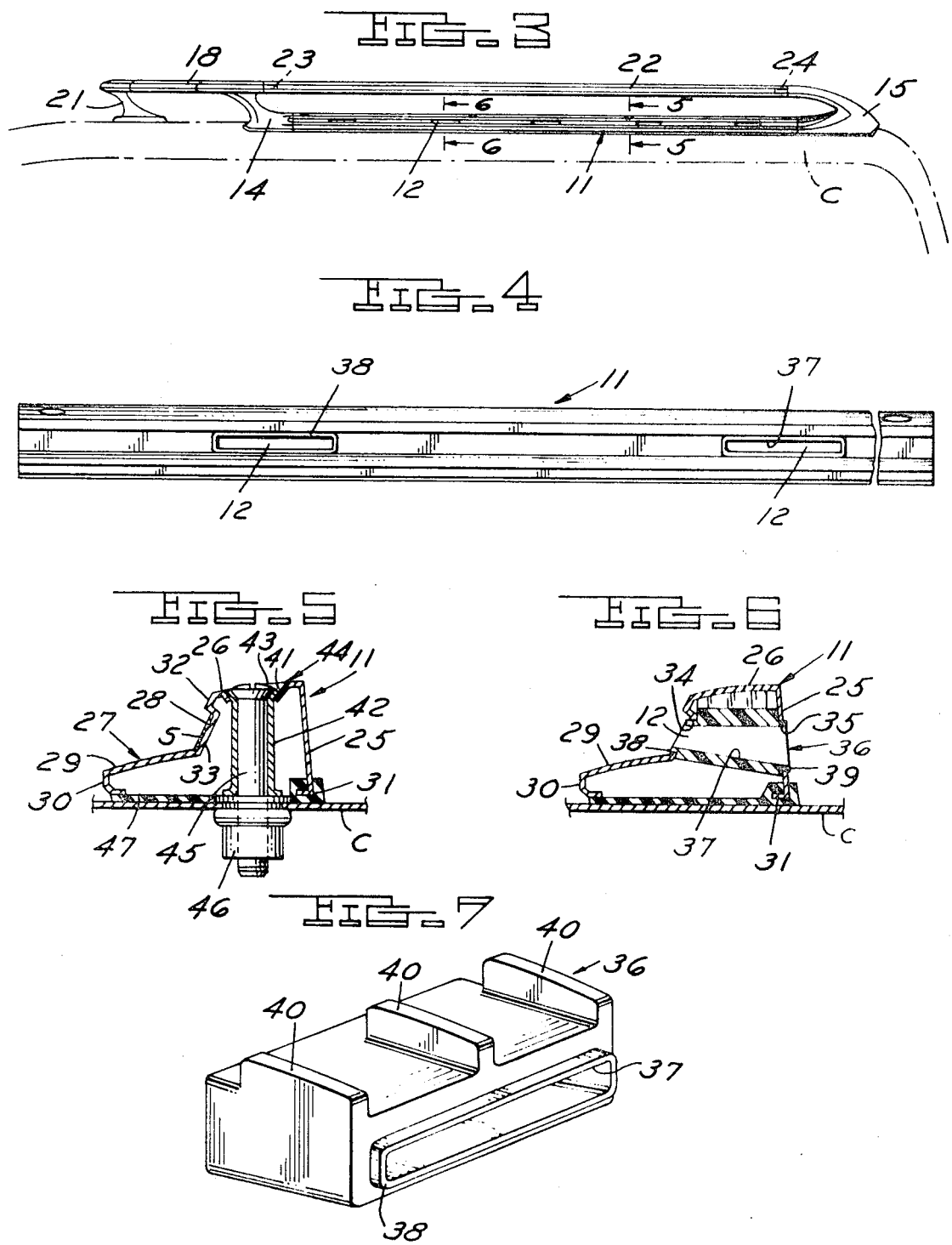

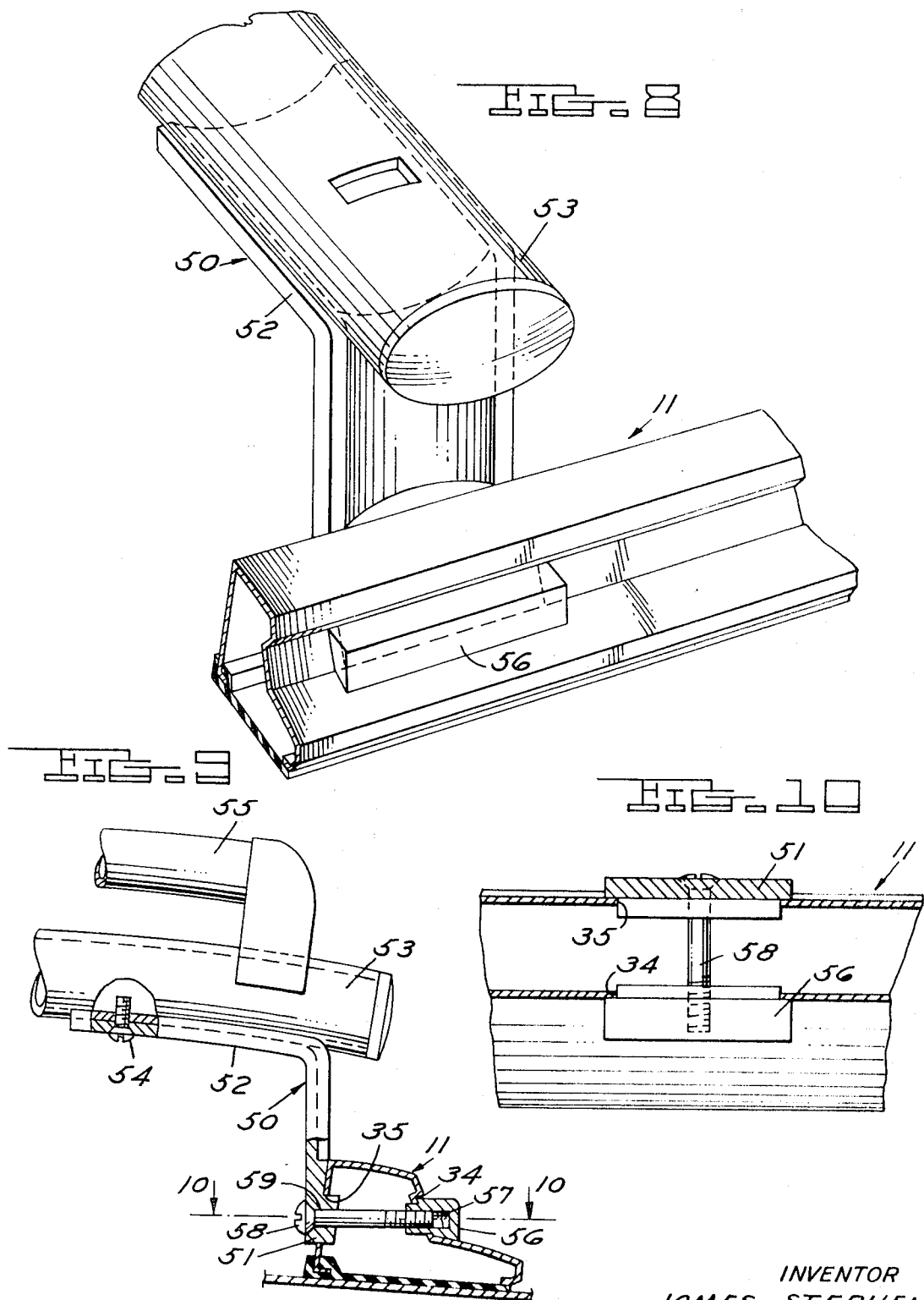

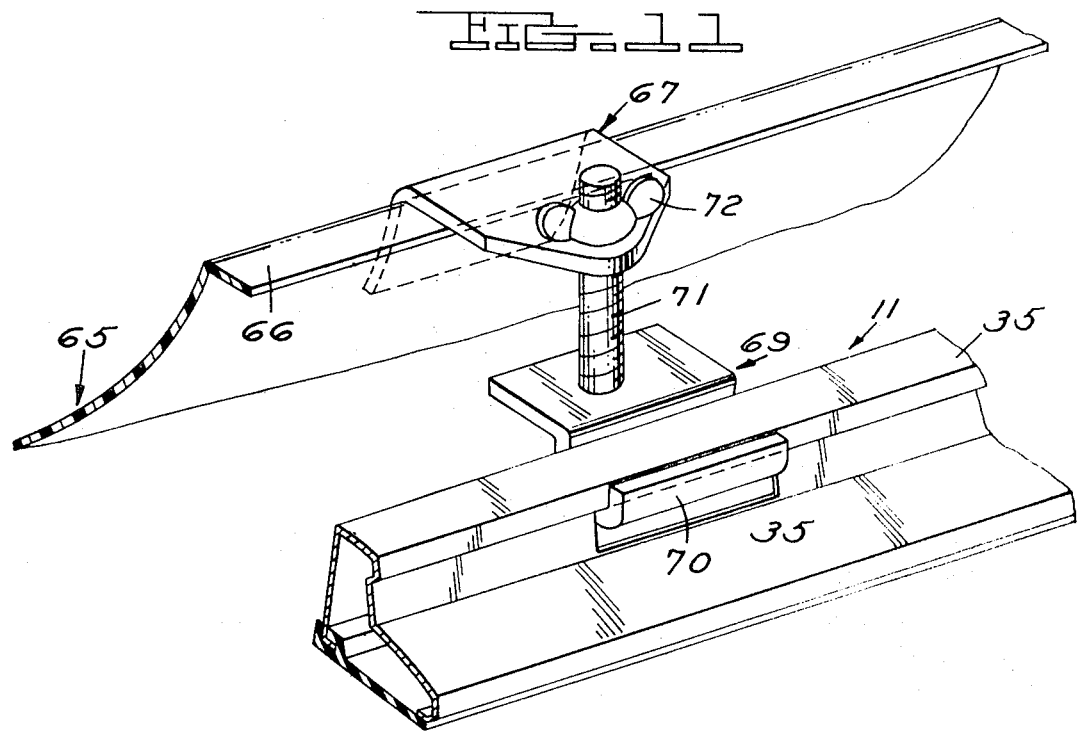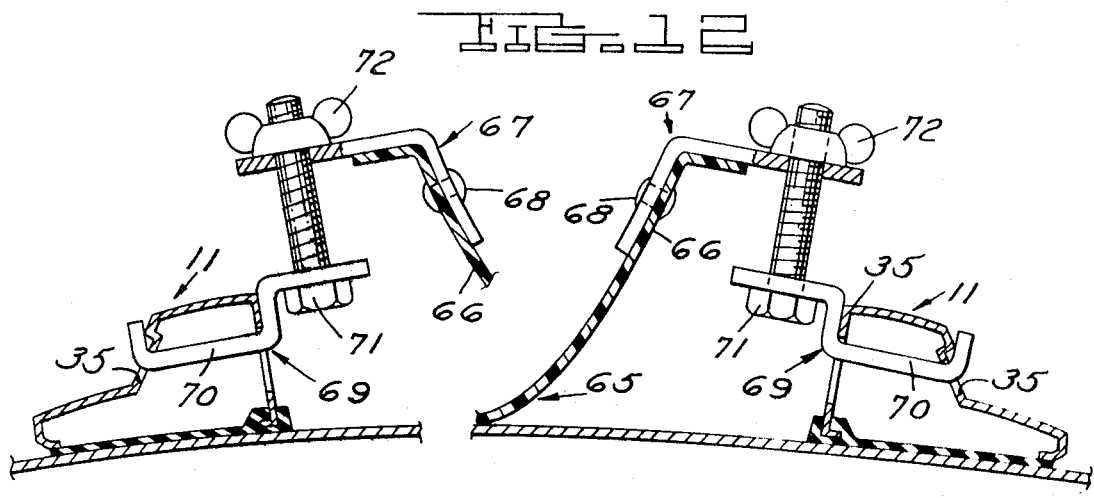

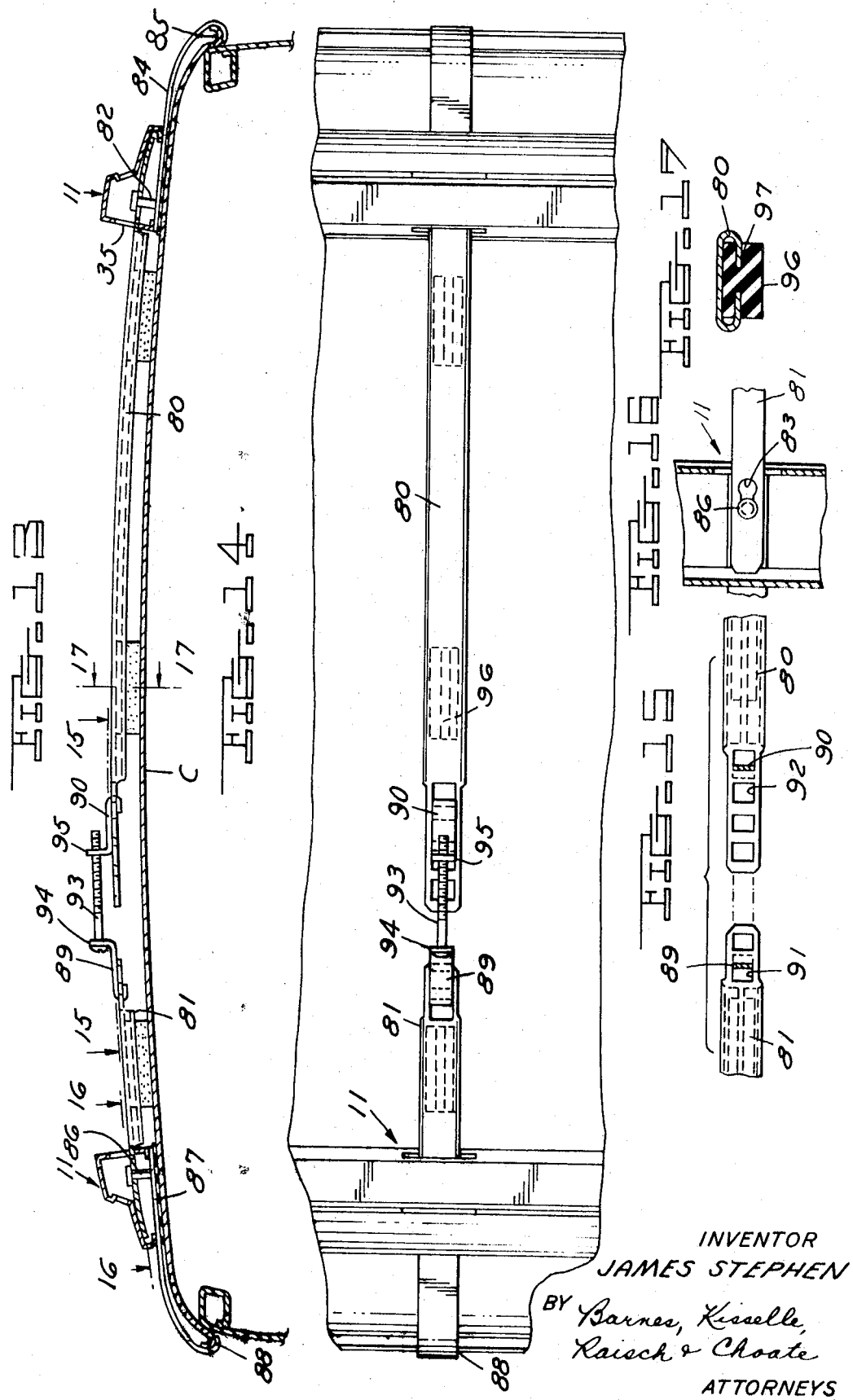

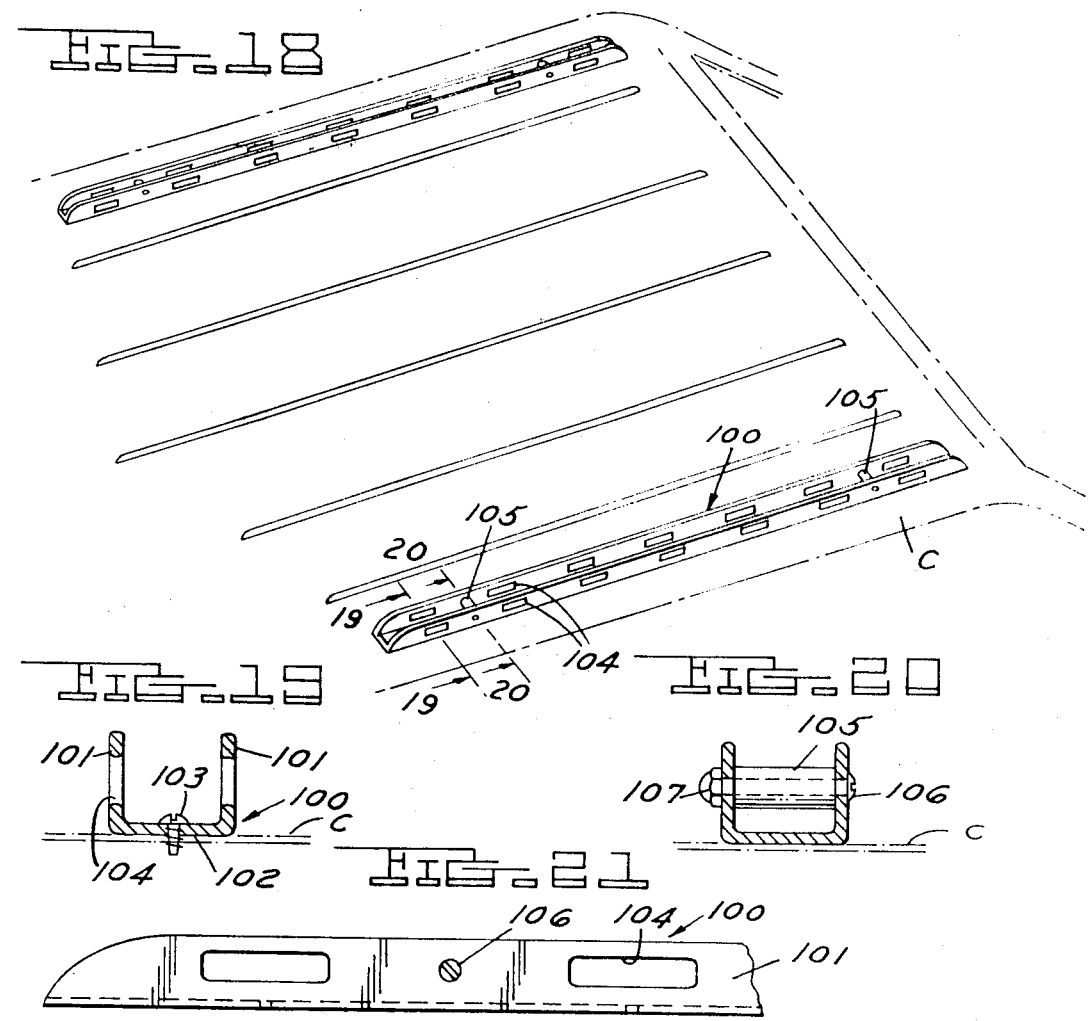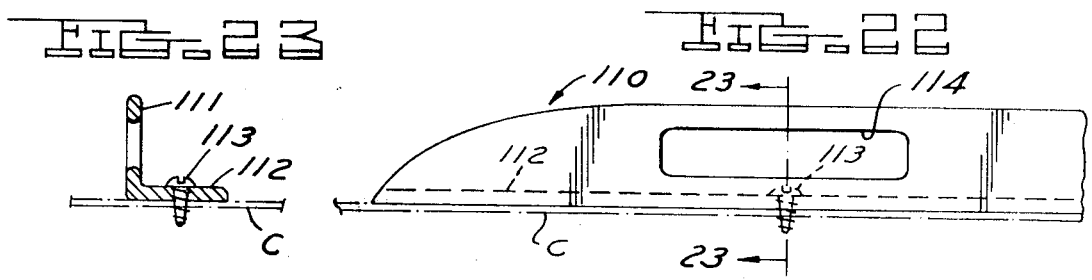

MODULAR LUGGAGE RACK

This invention relates to luggage racks for use on automobile tops.

Among the objects of the invention are to provide a novel luggage rack which incorporates novel side rails that can be used for tying down workloads; which can be readily modified to produce a luggage rack that has laterally and forwardly restraining rails; which is attractive; simple in construction, and low in cost.

In the drawings:

FIG. 1 is a perspective view of a luggage rack embodying the invention.

FIG. 2 is a perspective view of a modified form of luggage rack.

FIG. 3 is a side elevational view of the luggage rack shown in FIG. 2.

FIG. 4 is a fragmentary side elevational view of a portion of the luggage rack shown in FIGS. 1 and 3.

FIG. 5 is a fragmentary sectional view taken along the line 5—5 in FIG. 3.

FIG. 6 is a fragmentary sectional view taken along the line 6—6 in FIG. 3.

FIG. 7 is a perspective view on an enlarged scale of an insert utilized in the luggage rack.

FIG. 8 is a fragmentary perspective view of a modified form of the invention.

FIG. 9 is a part sectional front elevational view of a portion of the invention shown in FIG. 8.

FIG. 10 is a fragmentary sectional view taken along the line 10—10 in FIG. 9.

FIG. 11 is a fragmentary perspective view of a further modified form of the invention.

FIG. 12 is a fragmentary part sectional front elevational view of a portion of the invention shown in FIG. 11.

FIG. 13 is a transverse sectional view of a further modified form of the invention.

FIG. 14 is a plan view of the form of the invention shown in FIG. 13.

FIG. 15 is a fragmentary plan view of a portion of the invention shown in FIGS. 13 and 14.

FIG. 16 is a fragmentary sectional view taken along the line 16—16 in FIG. 13.

FIG. 17 is a fragmentary sectional view taken along the line 17—17 in FIG. 13.

FIG. 18 is a fragmentary perspective view of a further modified form of luggage rack.

FIG. 19 is a sectional view taken along the line 19—19 in FIG. 18.

FIG. 20 is a fragmentary sectional view taken along the line 20—20 in FIG. 18.

FIG. 21 is a side elevational view of the luggage rack shown in FIG. 18.

FIG. 22 is a fragmentary side elevational view of a further modified form of luggage rack.

FIG. 23 is a sectional view taken along the line 23—23 in FIG. 22.

Referring to FIG. 1, the luggage rack embodying the invention comprises a luggage rack bed made of longitudinally extending spaced parallel rails 10 that are fixed to the car top C by screws or the like. The rack further includes longitudinally extending side rails 11 of rolled sheet metal that have openings 12 at longitudinally spaced points along the length thereof, the distance between the openings being greater than the length of the openings. Ropes or straps can be threaded through the openings to serve as a means for tying down a load on the bed formed by the strips 10. Die cast end members 13 are telescoped within the ends of the side rails to close the ends and provide an attractive appearance. Alternatively the end members can be telescoped over the ends of the side rails or other forms of caps can be utilized to close the ends of the side rails.

In the form of the invention shown in FIG. 2, the side rails 11 have die cast stanchions 14, 15 attached thereto. The stanchions 14, 15 are secured to the car top and have projections 16, 17 that telescope within the ends of the side rails 11. Where the width of the car is substantial, crossrails 18 are telescoped over projections 19 on the stanchion 14 at one end and a projection 20 of a centrally disposed stanchion 21 at the other end.

An upper tubular crossrail 22 of rolled sheet metal is provided and the projections 23, 24 on the stanchions 14, 15 extend into the ends of the rail 22.

As shown in FIGS. 4-6, each side rail 11 is made of sheet metal and is generally inverted U-shaped in cross section including an inner sidewall 25, a generally horizontal upper wall 26 that is crowned upwardly and an outer sidewall 27 that has a first generally downwardly and outwardly inclined section that is more vertical than horizontal, a second generally horizontal section 29 extending from the lower edge of the section 28 and an inwardly extending flange section 30 extending from the lower edge of the section 29. A flange 31 is turned inwardly from the inner sidewall 25. The upper portion of the section 28 is provided with a longitudinally extending boss 32 and a strip of vinyl plastic S having pressure sensitive adhesive thereon is secured to the surface 33 of the base of the channel which is formed by the flange 32 and the section 27.

As shown in FIG. 6, the openings 12 in each side rail are defined by aligned openings 34, 35 in the walls 25, 27 in which an insert 36 is positioned. Each insert 36 is preferably made of a low friction material such as polypropylene or Delrin plastic and comprises a block having a transverse opening 37 therein. A flange 38, 39 extends axially from each end of the opening and engages the inner surface of the openings 34, 35 in the walls 27, 25. The upper surface of the block is formed with spaced ribs 40 that extend upwardly into contact with the underside of the top wall 26 of the strip 11 to minimize any tendency of the insert to snap out of the strip after it is inserted upwardly through the open bottom of the strip before the strip is mounted on the car top. The inserts function also to close the openings 34, 35 and prevent the entry of dirt and foreign matter and the collecting of such dirt and foreign matter within the side rail. Although the inserts are preferably made of plastic material, they can also be made of metal held in place by suitable means such as rivets or screws to perform the functions.

The top wall 26 is formed with longitudinally spaced openings 41 and a collar 42 is inserted in each opening and has a flange 43 engaging a complementary flange 44 in the top wall. The collar 42 extends downwardly and a bolt or rivet 45 is inserted through the collar 42 and a nut 46 is swaged on the bolt. An insulator strip 47 of rubber or the like is provided over the flange 31 and extends beneath flange 30 of the strip.

In the form of the invention shown in FIGs. 8-10, the side rails 11 are utilized to removably support a ski rack. As shown, brackets 50 are provided with inwardly turned portions 51 that extend into an opening 35 of the rail 11 in place of an insert 36. The bracket 50 further includes a generally horizontal portion 52 on which a crossrail 53 is fixed by screws 54. A bracket 50 is provided at each side rail. The pivoted members 55 are provided on the crossrail 53 in the manner more fully disclosed and described in the U.S. Pat. to Helm No. 3,223,302. A locking member 56 is adapted to close the opening 34 and has a threaded socket 57 into which a screw 58 is threaded after passing through an opening 59 in the portion 51 of bracket 50. This holds the bracket 50 in position and in turn supports the rail 53 in transverse relation to the side rail. It can be appreciated that a pair of crossrails 53 are provided in longitudinally spaced relation along the side rails 11 to support skis.

In the form of the invention shown in FIGS. 11 and 12, the side rails 11 are utilized to support a flexible bag 65 that has a peripheral lip 66. Brackets 67 are fixed to the lip 66 at longitudinally spaced points by rivets 68. A mounting bracket 69 is provided with a U-shaped portion 70 that extends through the openings 34, 35. A bolt 71 extends upwardly through the mounting bracket 69 and a wing nut 72 is threaded thereon to tension the peripheral lip 66 of the bag 65. By tightening the wing nut 72 the bag, filled with whatever material is being hauled such as luggage, is tied down between the side rails 11.

In the form of the invention shown in FIGS. 13–17, the side rails 11 are removably mounted on a car top C. This is achieved by utilization of straps 80, 81 which are generally C-shaped in cross section (FIG. 17). The end of strap 80 extends through opening 35 of one side rail 11 and is connected to a pin 82 by key-shaped opening 83. Pin 82 is fastened to a hold-down strap 84 that has its free end engaging the drain trough 85 of the car top C. Similarly the strap 81 is telescoped over a pin 86 fixed to a strap 87 engaging the other drain trough 88 of the car top. The inner ends of the straps 80, 81 are interconnected by brackets 89, 90 that have one end thereof selectively engaging openings 91, 92 in the straps 81, 80 and the other end thereof interconnected by a bolt 93 passing through an upwardly extending flange 94 on bracket 89 and threaded into an upwardly extending flange 95 in bracket 91. By threading the bolt 93 inwardly, the straps 80, 81 are tensioned to hold the side rail in position. Blocks 96 of resilient material are telescoped within the flanges 97 of the straps 80, 81 to resiliently engage the car top C.

In the form of the invention shown in FIGS. 18–20, the side rails 100 have a generally U-shaped cross section including spaced vertical legs 101 and a base 102. Each side rail 100 is fastened to the car top C by sheet metal screws 103 that extend through openings in the base 102 into the car top C. Each of the vertical legs 101 is provided with transversely aligned pairs of horizontal elongated openings 104 at longitudinally spaced points. The legs 101 are braced against movement relative to one another by tubular spacers 105 at longitudinally spaced points which are held in position by bolts 106 passing through spacers 105 and through legs 101 and having nuts 107 threaded thereon.

As in the previous form of the invention, the openings 104 may be utilized for the mounting of ski racks (FIGS. 8–10), and bags (FIGS. 11–12).

In the form of the invention shown in FIGS. 22 and 23, each side rail 110 has a generally angular cross section including a vertical leg 111 and a horizontal leg 112. Each side rail 110 is fastened to the car top C by sheet metal screws 113 extending through the horizontal leg 112. Vertical leg 111 is formed with horizontally elongated longitudinally spaced openings 114.

I claim:

1. The combination comprising
   a car top,
   a pair of transversely spaced longitudinally extending side rails fixed to said car top,
   each said side rail including a vertically extending wall,
   each said wall having longitudinally spaced longitudinally elongated openings therein,
   the space between said openings being several times greater than the length of said openings,
   said openings providing means for insertion of a tie down rope or the like.
   each said side rail comprising a generally inverted U cross section including a top wall and a second sidewall,
   said second sidewall having longitudinally spaced longitudinally elongated openings,
   the space between said openings being several times greater than the length of said openings,
   the openings in said sidewalls of each said rail being transversely aligned to permit the insertion of a tie down rope or the like.

2. The combination set forth in claim 1 wherein the outer sidewall of each said rail includes a generally horizontal portion.

3. The combination set forth in claim 1 including a resilient insulator member interposed between each said side rail and the car top.

4. The combination set forth in claim 1 wherein each said side rail is made of sheet metal and has inwardly turned flanges on the lower edge of each sidewall.

5. The combination set forth in claim 1 including a tubular insert extending between each pair of aligned openings.

6. The combination set forth in claim 5 wherein said insert is made of low-friction material.

7. The combination as set forth in claim 6 wherein said insert comprises a block having reduced cross section end portions disposed within said aligned openings in said sidewalls and shoulders spaced inwardly from said end portions engaging the inner surfaces of said sidewalls around the openings therein, said block having an opening therein extending through said end portions.

8. The combination set forth in claim 7, wherein the central portion of each insert is thickened to engage the inner surface of the top wall.

9. The combination set forth in claim 8, wherein said thickened portion comprises spaced ribs on said insert.

10. The combination set forth in claim 1 including a stanchion at each end of each said side rail and an upper rail extending between said stanchion of each said side rail.

11. The combination set forth in claim 10 including a cross-rail extending between opposed stanchions of the side rail.

12. The combination set forth in claim 10 wherein each said upper and side rail is made of sheet metal.

13. For use on a car top, the combination comprising a
   pair of transversely spaced longitudinally extending side rails adapted to be fixed to said car top,
   each said side rail comprising a generally inverted U-cross section including sidewalls and a top wall,
   each of the sidewalls having longitudinally spaced longitudinally elongated openings,
   the space between said openings being several times greater than the length of said openings,
   the openings in said sidewalls of each said rail being transversely aligned to permit the insertion of a tie down rope or the like.

14. The combination set forth in claim 13, wherein the outer sidewall of each said rail includes a generally horizontal portion.

15. The combination set forth in claim 13 including a resilient insulator member adapted to be interposed between each said side rail and the car top.

16. The combination set forth in claim 13 wherein each said side rail is made of sheet metal and has inwardly turned flanges on the lower edge of each sidewall.

17. The combination set forth in claim 13, including a tubular insert extending between each pair of aligned openings.

18. The combination set forth in claim 17, wherein said insert is made of low-friction material.

19. The combination set forth in claim 18 wherein said insert comprises a block having reduced cross section end portions disposed within said aligned openings in said sidewalls and shoulders spaced inwardly from said end portions engaging the inner surfaces of said sidewalls around the openings therein, said block having an opening therein through said end portions.

20. The combination set forth in claim 19 wherein the central portion of each insert is thickened to engage the inner surface of the top wall.

21. The combination set forth in claim 20 wherein said thickened portion comprises spaced ribs on said insert.

22. The combination set forth in claim 13 including a stanchion at each end of each said side rail and an upper rail extending between said stanchions of each said side rail.

23. The combination set forth in claim 22 including a cross-rail extending between opposed stanchions of the side rails.

24. The combination set forth in claim 22, wherein each said upper and side rail is made of sheet metal.

* * * * *